United States Patent
Yamada

(10) Patent No.: US 11,933,609 B2
(45) Date of Patent: Mar. 19, 2024

(54) INTERFEROMETER AND OPTICAL INSTRUMENT WITH INTEGRATED OPTICAL COMPONENTS

(71) Applicants: YOKOGAWA ELECTRIC CORPORATION, Tokyo (JP); Yokogawa Test & Measurement Corporation, Tokyo (JP)

(72) Inventor: Nobuhide Yamada, Hachioji (JP)

(73) Assignees: Yokogawa Electric Corporation, Tokyo (JP); Yokogawa Test & Measurement Corporation, Tokyo (JP)

( * ) Notice: Subject to any disclaimer, the term of this patent is extended or adjusted under 35 U.S.C. 154(b) by 62 days.

(21) Appl. No.: 17/644,933

(22) Filed: Dec. 17, 2021

(65) Prior Publication Data

US 2022/0196381 A1    Jun. 23, 2022

(30) Foreign Application Priority Data

Dec. 21, 2020    (JP) ................ 2020-211727

(51) Int. Cl.
G01B 9/02001    (2022.01)
G01B 9/02    (2022.01)
G01J 9/02    (2006.01)

(52) U.S. Cl.
CPC ........ *G01B 9/02011* (2013.01); *G01J 9/0246* (2013.01); *G01B 9/02051* (2013.01);
(Continued)

(58) Field of Classification Search
CPC ............ G01J 9/0246; G01J 2009/0265; G01B 9/02011; G01B 9/02051; G01B 2290/45; G01B 2290/70
See application file for complete search history.

(56) References Cited

U.S. PATENT DOCUMENTS 5,374,991 A * 12/1994 Atkinson ........... G01B 9/02081
356/493

FOREIGN PATENT DOCUMENTS

JP    59-48716 A    3/1984
JP    9-33368 A    2/1997
(Continued)

OTHER PUBLICATIONS

English translation of JP 2010043984. Acquired from Espacenet on Mar. 24, 2023. (Year: 2023).*

*Primary Examiner* — Michael A Lyons
(74) *Attorney, Agent, or Firm* — RANKIN, HILL & CLARK LLP

(57) ABSTRACT

The interferometer 10 according to this disclosure includes: a first optical component 12 that splits each of the P polarization component and the S polarization component of the light to be measured into the first optical path R1 and the second optical path R2 and combines the light to be measured; a second optical component 13 placed in the first optical path; a third optical component 14 that splits the light to be measured into the P polarization component and the S polarization component; and a P polarization detector 11a and an S polarization detector 11b that respectively detect the P polarization component and the S polarization component split by the third optical component, wherein the second optical component has an optical surface that changes the propagation direction of the light to be measured and gives a phase difference between the P polarization component and the S polarization component.

12 Claims, 12 Drawing Sheets

(52) U.S. Cl.
CPC ...... *G01B 2290/20* (2013.01); *G01B 2290/45* (2013.01); *G01B 2290/70* (2013.01); *G01J 2009/0265* (2013.01)

(56) References Cited

FOREIGN PATENT DOCUMENTS

| | | |
|---|---|---|
| JP | 2000-146525 A | 5/2000 |
| JP | 2002-202203 A | 7/2002 |
| JP | 2004-55775 A | 2/2004 |
| JP | 2010-43984 A | 2/2010 |
| JP | 2010-151572 A | 7/2010 |
| JP | 2019-526044 A | 9/2019 |
| WO | 2018/002593 A1 | 1/2018 |

* cited by examiner

INTERFEROMETER AND OPTICAL INSTRUMENT WITH INTEGRATED OPTICAL COMPONENTS

CROSS-REFERENCE TO RELATED APPLICATION

This application claims priority to and the benefit of Japanese Patent Application No. 2020-211727 (filed on Dec. 21, 2020), the entire contents of which are incorporated herein by reference.

TECHNICAL FIELD

This disclosure relates to interferometers and optical instruments.

BACKGROUND

A technique for measuring the wavelength of the light to be measured has been conventionally known.

For example, Patent Literature 1 (PTL 1) discloses a light wavelength measurement device that measures the variation amount of wavelength of the input light using a Michelson interferometer. For example, Patent Literature 2 (PTL 2) discloses a wavelength monitor that can detect a change in the wavelength of a wavelength tunable light source with high accuracy and high stability using a Mach-Zehnder interferometer.

CITATION LIST

Patent Literature

PTL 1: JP2002-202203(A)
PTL 2: JP2004-055775(A)

SUMMARY

An interferometer according to some embodiments includes: a first optical component that splits each of P polarization component and S polarization component of the light to be measured, which is incident on the interferometer, into a first optical path and a second optical path, and combines the light to be measured split into the first optical path and the second optical path; a second optical component placed in the first optical path; a third optical component that splits the light to be measured, which is combined by the first optical component, into the P polarization component and the S polarization component; and a P polarization detector and an S polarization detector that detect the P polarization component and the S polarization component split by the third optical component, respectively, wherein the second optical component has an optical surface that changes the propagation direction of the light to be measured and gives a phase difference between the P polarization component and the S polarization component.

BRIEF DESCRIPTION OF THE DRAWINGS

In the accompanying drawings.

DETAILED DESCRIPTION

Figure 1:
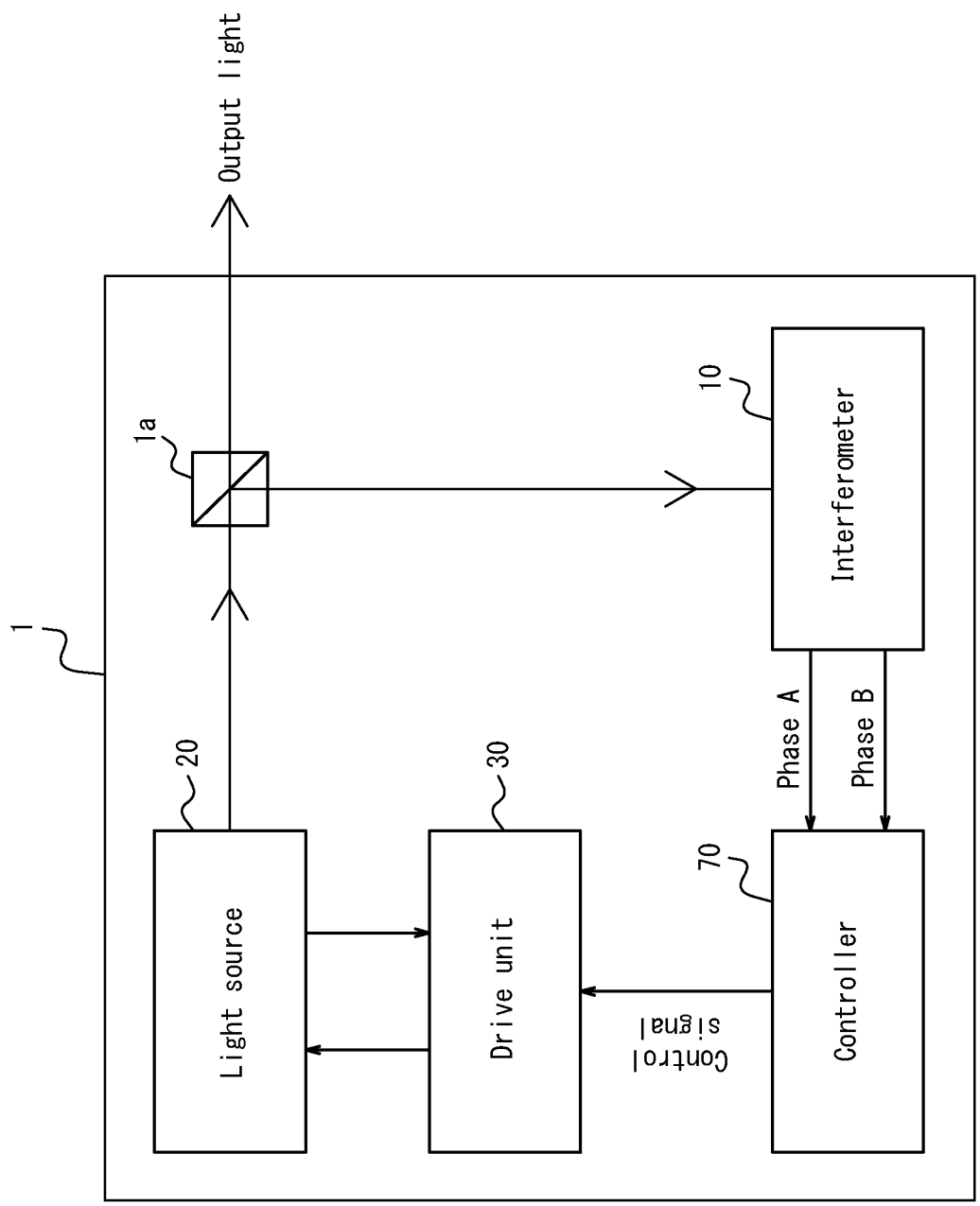
FIG. 1 is a schematic diagram illustrating a schematic configuration of an optical instrument according to an embodiment of this disclosure.

In the conventional Michelson interferometer and Mach-Zehnder interferometer, the waveplate that changes the polarization state of the light to be measured and the mirror that changes the propagation direction of the light to be measured are placed, as different optical elements, apart from each other in the optical path of the light to be measured. Such conventional interferometers have a problem that the configuration of the optical system is complicated, which results in a large workload required by the conventional interferometers to assemble the optical system and reliably obtain the interference of the light to be measured.

In addition, the waveplate is composed of birefringent crystals such as quartz. In such a case, even a zero-order waveplate with a relatively wide wavelength range, which has a large wavelength dependence, was difficult to apply in a wide wavelength range exceeding 100 nm, for example. To use the waveplate in a wide wavelength range, it was necessary to compensate wavelength-dependent phase difference. As a result, errors of the interferometer increased and the load of arithmetic processing to the interference signals from the interferometer increased.

Therefore, an object of this disclosure is to provide an interferometer and an optical instrument that have a simplified optical system configuration and can apply in a wide wavelength range.

An interferometer according to some embodiments includes: a first optical component that splits each of P polarization component and S polarization component of the light to be measured, which is incident on the interferometer, into a first optical path and a second optical path, and combines the light to be measured split into the first optical path and the second optical path; a second optical component placed in the first optical path; a third optical component that splits the light to be measured, which is combined by the first optical component, into the P polarization component and the S polarization component; and a P polarization detector and an S polarization detector that detect the P polarization component and the S polarization component split by the third optical component, respectively, wherein the second optical component has an optical surface that changes a propagation direction of the light to be measured and gives a phase difference between the P polarization component and the S polarization component.

This allows the configuration of the optical system to be simplified in the interferometer and the optical instrument. For example, the optical surface of the second optical component gives a phase difference between the P polarization component and the S polarization component of the light to be measured while changing the propagation direction of the light to be measured. This simplifies the configuration of the optical system in the interferometer compared with the conventional Michelson interferometer and the Mach-Zehnder interferometer, where the function of changing the polarization state of the light to be measured and the function of changing the propagation direction of the light to be measured are realized by different optical elements. In other words, the number of components of the optical system in the interferometer is reduced. Therefore, the optical system in the interferometer can be configured at a low cost. In addition, in the interferometer, the workload for assembling the optical system and difficulty of alignment for obtaining interference of the light to be measured is reduced.

In addition, the interferometer and the optical instrument can apply in a wide wavelength range because of its low wavelength dependence of phase difference between the P polarization component and the S polarization component induced by the optical surface of the second optical component, instead of using a waveplate composed of birefringent crystals such as quarts as the conventional interferometer. Therefore, the interferometer can realize stable operation in a wide wavelength range. The interferometer can be easily used even in a wide wavelength range exceeding 100 nm, for example. This also reduces the need of correction for the phase difference. As a result, wavelength retardation errors of the interferometer are reduced and the load of the arithmetic processing to the interference signals from the interferometer is also reduced.

In the interferometer according to an embodiment, the first optical component, the second optical component and the third optical component may all be integrated.

In this manner, the configuration of the optical system of the interferometer is further simplified, compared with the conventional Michelson and Mach-Zehnder interferometers, where each optical element is placed apart from each other. In addition, there is no boundary with the surrounding atmosphere in each optical component except for the incident surface of the first optical component where the light to be measured enters and the two exit surfaces of the third optical component where the light to be measured exits. In other words, at all joint surfaces of optical components, materials made of glass, for example, are closely adhered to each other. This improves the refractive index matching at the joints and reduces the reflection loss of the light to be measured and the influence of stray light due to reflection. For example, problems such as generation of stray light due to multiple reflections, which adds noise to the interference signals, can be prevented. As a result, there is no need to apply a non-reflective coating and a low-reflective coating at all joint surfaces, and it is possible to configure the optical system in the interferometer at a low cost.

In the interferometer according to an embodiment, the optical surface of the second optical component may include a reflective surface. In this manner, the interferometer can give a phase difference between the P polarization component and S polarization component of the light to be measured while changing the propagation direction of the light to be measured by reflection of the light to be measured on the reflective surface.

In the interferometer according to an embodiment, the reflective surface in the second optical component may include a first reflective surface on the path of the light to be measured, which is split by the first optical component, is reflected by total reflection and a second reflective surface on the path of the light to be measured, which is reflected by the first reflective surface, is further reflected by total reflection toward the first optical component.

This allows almost zero transmission loss on the first and second reflective surfaces in the first optical path in the interferometer. The interferometer can form a first optical path, which is a return path of the light to be measured, while suppressing such a transmission loss.

In the interferometer according to an embodiment, the phase difference may be 45° in each of the first and second reflective surfaces.

Thus, in the second optical component, a total phase difference of 90° is caused between the P polarization component and S polarization component of the light to be measured. As a result, in response to a change in the wavelength of the output light of the light source, two interference signals having sinusoidal waveforms of phase A and phase B with phase difference of 90° are obtained from the detectors. Therefore, they are similar to signals of a rotary encoder for detecting the rotation angle of a motor can be obtained, and wavelength control of the light source based on feedback control to the drive mechanism of the light source, etc., can be easily executed. For example, the encoder signal processing circuit of the motor constituting the drive mechanism of the light source can be used as it is, and the motor can be directly driven by the interference signals from the interferometer.

In the interferometer according to an embodiment, each of the incident angle and the reflection angle of the light to be measured may be 45° on each of the first reflective surface and the second reflective surface. In this case, the light to be measured through a first optical path returns at a right angle.

In the interferometer according to an embodiment, the second optical component may include a prism made of glass. As a result, the optical components can be provided at a lower cost compared with incorporating the waveplate composed of birefringent crystals such as quartz, which changes the polarization state of the light to be measured in the conventional interferometers. Therefore, the interferometer can be configured at low cost. In addition, the interferometer can achieve stable operation in a wide wavelength range. For example, the interferometer can be easily used even in a wide wavelength range exceeding 100 nm.

In the interferometer according to an embodiment, the first optical component may include a first non-polarizing beam splitter that splits each of the P polarization component and the S polarization component into the first optical path and the second optical path, and a second non-polarizing beam splitter that combines the light to be measured split into the first optical path and the second optical path.

This allows the light to be measured, which is incident on the interferometer, to be split evenly, for example, 50:50, and then combined again. The first optical component is capable of equally splitting or combining each of the P polarization component and the S polarization component, for example, 50:50, regardless of the polarization state of the light to be measured.

In the interferometer according to an embodiment, the third optical component includes a first polarizing beam splitter and a second polarizing beam splitter, and the P polarization detector includes a first detector that detects the P polarization component split by the first polarizing beam splitter and a third detector that detects the P polarization component split by the second polarizing beam splitter, and the S polarization detector may include a second detector that detects the S polarization component split by the first polarizing beam splitter and a fourth detector that detects the S polarization component split by the second polarizing beam splitter.

Thus, the controller of the optical instrument can easily calculate the incident power of the light to be measured by adding the four interference signals. The controller of the optical instrument can accurately perform normalization processing to the sinusoidal interference signals in response to a change in the incident power of the light to be measured. In this manner, the interferometer can be used to correct the interference signal in response to a change in the incident power of the light to be measured.

The optical instrument according to some embodiments comprises any of the above described interferometers. As a result, the optical instrument will have the same effect as above.

According to this disclosure, it is possible to provide interferometers and optical instruments that simplify the configuration of the optical system and can apply in a wide wavelength range.

The background and problems of the conventional technology will be described in more detail below.

For example, a Michelson interferometer disclosed in PTL 1 is a two-beam interferometer in which the input light as the light to be measured is split into two beams by a beam splitter and then combined again by the same beam splitter. At this time, an optical element placed in one of the optical paths changes the polarization state of one of the light to be measured which separated by the beam splitter. Thus, the light to be measured has propagated in one optical path and its polarization state has changed. After the separated two beams are combined by the beam splitter, by detecting the polarization state of such a combined light, the wavelength of the light to be measured can be obtained.

For example, when the optical element placed in one of the optical paths of the two-beam interferometer described above includes a ⅛ waveplate, the light to be measured passes through the ⅛ waveplate twice by reciprocation in one optical path. This causes a phase shift in λ/4 between the P polarization component and the S polarization component of the light to be measured.

For example, when the optical element placed in one of the optical paths of the two-beam interferometer described above includes a quarter waveplate, the light to be measured passes through the quarter waveplate once only in one of outward path and return path in one of the optical paths. This causes a phase shift in λ/4 between the P polarization component and the S polarization component of the light to be measured.

For example, a Mach-Zehnder interferometer disclosed in PTL 2 is a two-beam interferometer in which the input light as the light to be measured is split into two by one beam splitter and then combined again by another beam splitter. Other explanations regarding the configuration and function of the Mach-Zehnder interferometer are the same as those described above for the Michelson interferometer.

The Michelson interferometer and the Mach-Zehnder interferometer described above had a system complexity issue in their configuration. In addition, they have the following problems.

For example, an optical retarder element, that is placed in one optical path and changes the polarization state of the light to be measured, is incorporated a ⅛ waveplate, a quarter waveplate, or any waveplate which made of birefringent crystals. Such an optical element was usually expensive. In addition, even a zero-order waveplate with a relatively wide wavelength range use had a large wavelength dependence in the characteristics of retardation and was difficult to apply in a wide wavelength range exceeding 100 nm. For example, to use it in a wide wavelength range exceeding 100 nm, it was necessary to compensate the phase difference error.

In the configurations as disclosed in PTL 1 and PTL 2, there was a boundary with the surrounding atmosphere for each optical component. In order to reduce the reflection loss at the boundary and the influence of stray light due to reflection, expensive non-reflective or low-reflective coating had to be applied to the surface of the optical component.

It is therefore an object of this disclosure to provide an interferometer and an optical instrument in which the configuration of the optical system is simplified to solve the above described problems. It is also an object of this disclosure to provide an interferometer and an optical instrument in which an optical system in the interferometer can be configured at a low cost. For example, it is an object to provide an interferometer and an optical instrument capable of being used easily in a wide wavelength range exceeding 100 nm.

An embodiment of this disclosure will be mainly described below with reference to the drawings.

FIG. 1 is a schematic diagram illustrating a schematic configuration of an optical instrument 1 according to an embodiment of this disclosure. A part of the configuration of the optical instrument 1 according to an embodiment of this disclosure will be mainly described with reference to FIG. 1. The optical instrument 1 has an interferometer 10, a light source 20, a drive unit 30 and a controller 70 as a part of the configuration. The configuration and the function of the interferometer 10 constituting a part of the optical instrument 1 will be described below with reference to mainly FIG. 3 through FIG. 6.

The optical instrument 1 includes, for example, any device capable of controlling the wavelength of the output light from the light source 20 based on the interferometer 10. For example, the optical instrument 1 includes a laser device such as a wavelength tunable light source. For example, the optical instrument 1 includes a wavelength tunable light source used in optical communication systems, Light Detection and Ranging (LiDAR) devices, Optical Coherence Tomography (OCT) systems, Optical Frequency Domain Reflectometry (OFDR), and the like.

At this time, the interferometer 10 is built in the optical instrument 1 as a wavelength monitor or a wavelength locker to monitor or control the wavelength of the output light from the light source 20. For example, the interferometer 10 can also be used to control when the wavelength of the output light from the light source 20 is swept in the optical instrument 1.

The light source 20 includes any light source such as a semiconductor laser, for example. The light source 20 is driven by the drive unit 30. For example, when the light source 20 includes a semiconductor laser, the semiconductor laser is driven by the injection current output from the drive unit 30. For example, the light source 20 may further include a mirror and a drive mechanism such as a motor that moves or rotates the mirror. The light source 20 may output light with a wavelength that can be varied by moving the mirror based on the control of the drive mechanism by the drive unit 30.

The drive unit 30 includes any module that can drive the light source 20 based on the control signal output from the controller 70, for example. For example, when the light source 20 includes a semiconductor laser, the drive unit 30 includes a laser controller that outputs an injection current to drive the semiconductor laser.

The controller 70 includes one or more processors. In an embodiment, the "processor" is, but is not limited to, a general purpose processor or a dedicated processor specialized for a particular process. The controller 70 is communicatively connected to each component constituting the optical instrument 1, and controls the operation of the entire optical instrument 1.

The output light from the light source 20 is split into two optical paths by a beam splitter 1a. The output light split into one of the optical paths is emitted to the outside of the optical instrument 1. The output light split into the other optical path is incident, as the light to be measured, on the interferometer 10 placed inside the optical instrument 1. As shown in the principle of interference described below, the interferometer 10 outputs to the controller 70 two interference signals with sinusoidal waveforms of phase A and phase B, which are different in phase by 90°, obtained in response to a change in the wavelength of the output light.

The controller 70 obtains these interference signals output from the interferometer 10. The controller 70 outputs control signals to the drive unit 30 based on the obtained interference signals. The drive unit 30 drives the light source 20 based on the control signals output from the controller 70. In this manner, the interferometer 10 can also be used to detect a change in the wavelength of the output light from the light source 20 to feedback control the light source 20.

Figure 2:
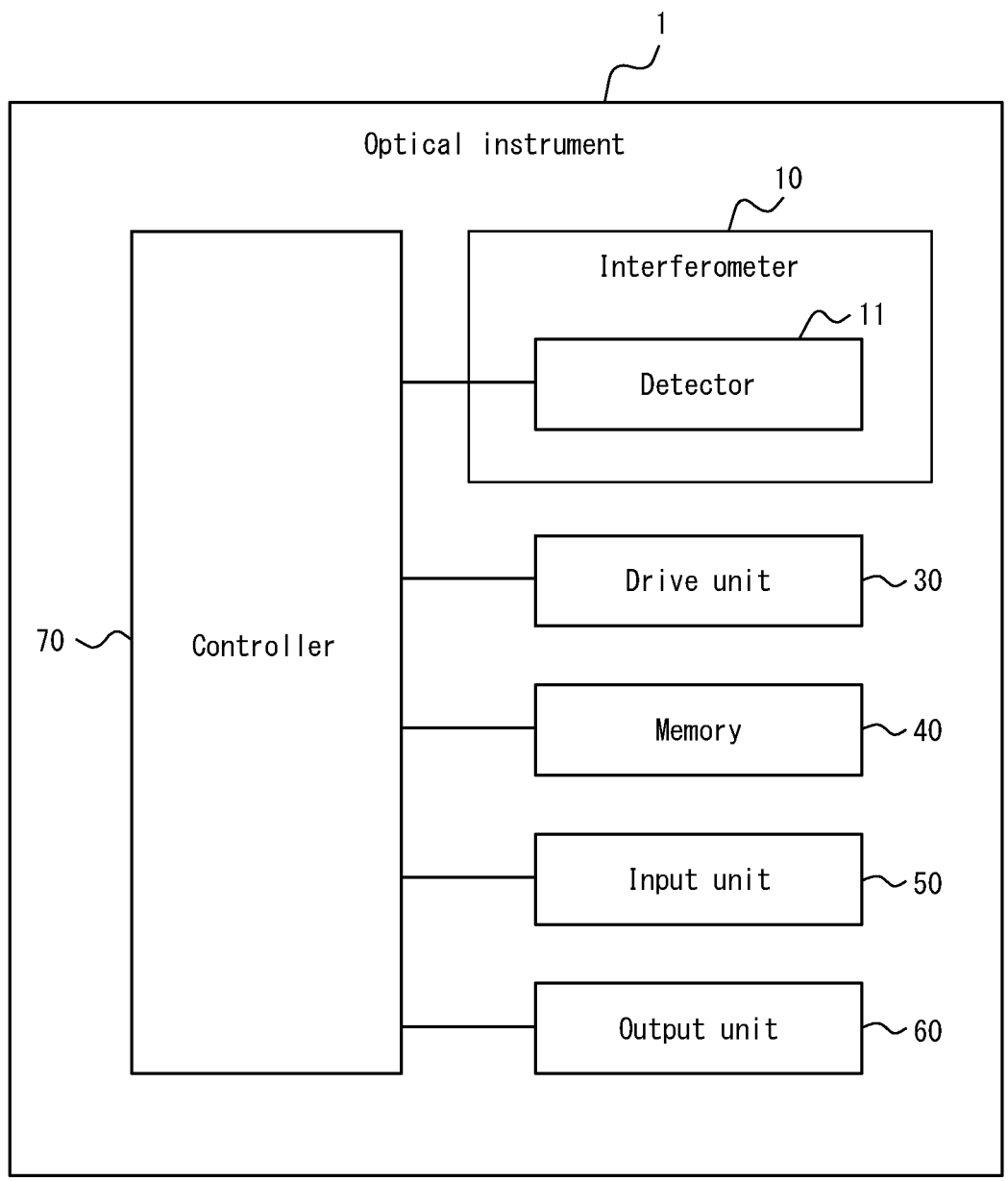
FIG. 2 is a block diagram illustrating a schematic configuration of the optical instrument in FIG. 1.

FIG. 2 is a block diagram illustrating a schematic configuration of the optical instrument 1 in FIG. 1. Further configuration of the optical instrument 1 according to an embodiment of this disclosure will be mainly described below with reference to FIG. 2. The optical instrument 1 has a memory 40, an input unit 50 and an output unit 60, in addition to the interferometer 10, the light source 20, the drive unit 30 and the controller 70. The interferometer 10 has a detector 11.

The memory 40 includes any memory module including Hard Disk Drive (HDD), Solid State Drive (SSD), Electrically Erasable Programmable Read-Only Memory (EEPROM), Read-Only Memory (ROM), and Random Access Memory (RAM). The memory 40 may serve as, for example, a main memory device, an auxiliary memory device, or a cache memory. The memory 40 stores any information used for the operation of the optical instrument 1. For example, the memory 40 stores the information on the interference signals detected by the detector 11. For example, the memory 40 stores system programs, application programs, etc. The memory 40 is not limited to the one built in the optical instrument 1, and may include an external storage module connected by a digital input/output port such as Universal Serial Bus (USB).

The input unit 50 includes one or more input interfaces that accept user input operations and obtain input information based on the user's operations. For example, the input unit 50 includes, but is not limited to, a physical key, a capacitance key, a touch screen integrally provided with the display of the output unit 60, a microphone that accepts voice input, and the like.

The output unit 60 includes one or more output interfaces that output information to the users. For example, the output unit 60 includes, but is not limited to, a display that outputs information as an image, a speaker that outputs information as voice, and the like.

For example, the controller 70 stores the information on the interference signals detected by the detector 11 in the memory 40. For example, the controller 70 calculates the change in the wavelength of the light to be measured based on the obtained information on the interference signals. For example, the controller 70 outputs, by the output unit 60, the current wavelength of the output light from the light source 20 based on the calculated change in the wavelength of the light to be measured to the users.

First Embodiment of the Interferometer 10

Figure 3:
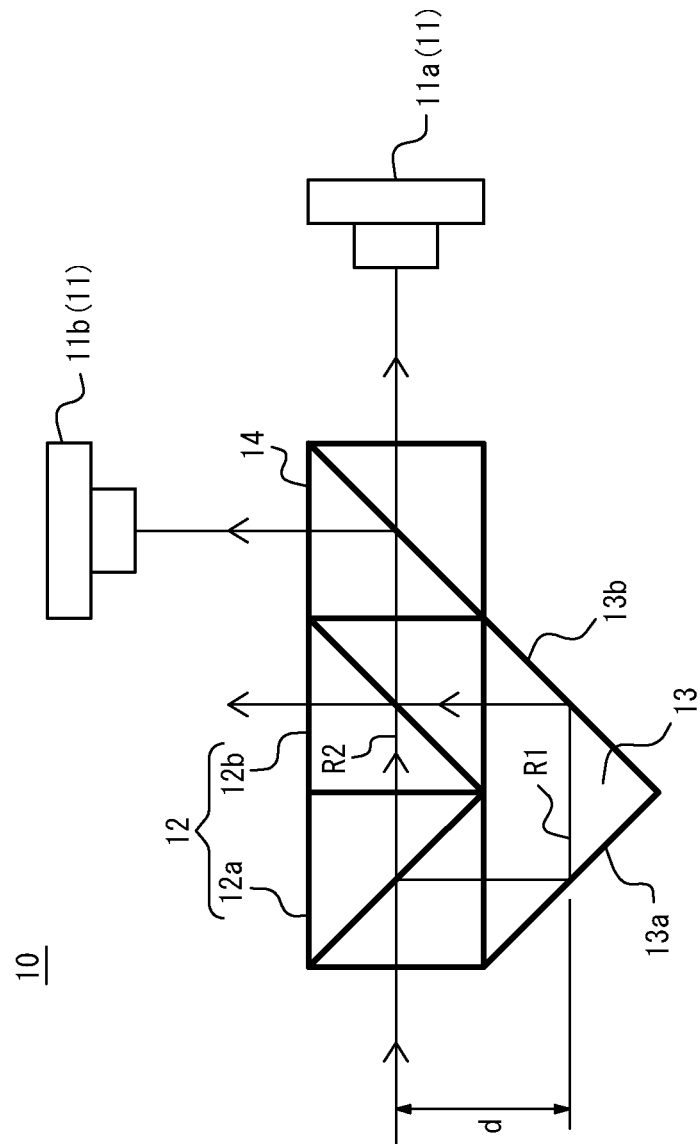
FIG. 3 is a schematic diagram illustrating a first embodiment of an interferometer in FIG. 1.

FIG. 3 is a schematic diagram illustrating the first embodiment of the interferometer 10 in FIG. 1. The configuration and the function of the interferometer 10 according to the first embodiment will be mainly described below with reference to FIG. 3. The interferometer 10 has, in addition to the detector 11, a first optical component 12, a second optical component 13 and a third optical component 14. In FIG. 3, the light to be measured is incident on the interferometer 10 from the left side to the right side, and propagates through the optical system in the interferometer 10.

The first optical component 12 splits each of the P polarization component and the S polarization component of the light to be measured, which is incident on the interferometer 10, into the first optical path R1 and the second optical path R2. The first optical component 12 also combines the light to be measured split into the first optical path R1 and the second optical path R2.

For example, the first optical component 12 includes a first non-polarizing beam splitter 12a and a second non-polarizing beam splitter 12b. The first non-polarizing beam splitter 12a splits each of the P polarization component and the S polarization component of the light to be measured, which is incident on the interferometer 10, into the first optical path R1 and the second optical path R2. The first non-polarizing beam splitter 12a splits the light to be measured into the first optical path R1 and the second optical path R2 at a ratio of 50:50. The second non-polarizing beam splitter 12b combines the light to be measured split into the first optical path R1 and the second optical path R2.

The second optical component 13 includes, for example, a prism made of glass material. The second optical component 13 includes, for example, a 45° right-angle prism made of glass material with a refractive index of 1.5538, assuming that the surroundings are a vacuum. The second optical component 13 is placed in the first optical path R1. The second optical component 13 guides the P polarization component and the S polarization component of the light to be measured, which are split in the first non-polarizing beam splitter 12a and propagate along the first optical path R1 in the second optical component 13, and emits them toward the second non-polarizing beam splitter 12b.

The second optical component 13 has an optical surface that changes the propagation direction of the light to be measured in the first optical path R1 and gives a phase difference between the P polarization component and the S polarization component of the light to be measured. For example, the optical surface of the second optical component 13 includes a reflective surface. For example, the reflective surface of the second optical component 13 includes a first reflective surface 13a and a second reflective surface 13b. On the first reflective surface 13a, the light to be measured split by the first non-polarizing beam splitter 12a is reflected by total reflection. On the second reflective surface 13b, the light to be measured reflected by the first reflective surface 13a is further reflected toward the second non-polarizing beam splitter 12b by total reflection.

On each of the first reflective surface 13a and the second reflective surface 13b, the incident angle and the reflection angle of the light to be measured are 45° each, for example. On each of the first reflective surface 13a and the second reflective surface 13b, a phase difference given between the P polarization component and the S polarization component of the light to be measured is 45°, for example. That is, the second optical component 13 gives, for example, a phase difference of 90° in total between the P polarization component and the S polarization component of the light to be measured, in the first optical path R1.

The third optical component 14 splits the light to be measured, which is combined by the second non-polarizing beam splitter 12b of the first optical component 12, into the P polarization component and the S polarization component. For example, the third optical component 14 includes a polarizing beam splitter. The third optical component 14 transmits the P polarization component of the light to be measured and guides it to a P polarization detector 11a described below. The third optical component 14 reflects the S polarization component of the light to be measured and guides it to an S polarization detector 11b described below.

In the first embodiment, the first optical component 12, the second optical component 13 and the third optical component 14 are all integrated. For example, the first non-polarizing beam splitter 12a, the second non-polarizing beam splitter 12b, the second optical component 13 and the third optical component 14 are all integrated by the optical contact at each joint surface between adjacent optical components. That is, no adhesive intervenes as a refractive index matching agent at all the joint surfaces. In addition, a non-reflective coating and a low-reflective coating are not formed at all joint surfaces. In contrast, for example, a non-reflective coating or a low-reflective coating is formed on the incident surface of the first optical component 12 where the light to be measured enters and the two exit surfaces of the third optical component 14 where the light to be measured exits.

The detector 11 detects the light to be measured that is guided by the third optical component 14. The detector 11 includes the P polarization detector 11a and the S polarization detector 11b that respectively detect the P polarization component and the S polarization component of the light to be measured split by the third optical component 14. The detector 11 is configured so that the wavelength of the light to be measured is included in the wavelength range of the detector 11 having a predetermined light receiving sensitivity. For example, the detector 11 includes a photodiode. The detector 11 outputs detected interference signals to the controller 70 through an electrical signal processing circuit. At this time, the interference signals output from the detector 11 may be electrically amplified by, for example, any amplifier circuit included in the electric signal processing circuit.

The light to be measured, which is incident on the interferometer 10, enters the optical surface in a linearly polarized state tilted by 45° with respect to the optical surface inside the first non-polarizing beam splitter 12a. The light to be measured is split into the transmitted light and the reflected light at a power ratio of 1:1. The reflected light propagates along the first optical path R1 and the transmitted light propagates along the second optical path R2.

The light to be measured split into the first optical path R1 changes its direction on the first reflective surface 13a of the second optical component 13 by total reflection. The light to be measured split into the first optical path R1 is incident on the first reflective surface 13a at an incident angle of 45°. At this time, the light to be measured is incident on the first reflective surface 13a in a linearly polarized state tilted by 45° with respect to the first reflective surface 13a. The light to be measured is divided into the P polarization component, whose polarization direction is parallel to the incident plane of first reflective surface 13a, and the S polarization component, whose polarization direction is perpendicular to the incident plane of first reflective surface 13a. The power ratio between the P polarization component and the S polarization component of the light to be measured is 1:1.

When the light to be measured is reflected on the first reflective surface 13a by total reflection, a phase difference of 45°, or $\pi/4 = \lambda/8$, occurs between the P polarization component and the S polarization component of the light to be measured. More specifically, the P polarization component and the S polarization component of the light to be measured receive phase changes different from each other due to total reflection on the first reflective surface 13a. Assuming that, on the first reflective surface 13a, the phase difference received by the P polarization component of the light to be measured is $\theta p$ and the phase difference received by the S polarization component of the light to be measured is $\theta s$, their phase changes have the following relationship.

$$\tan\frac{\theta_P}{2} = -\frac{\sqrt{\sin^2\varphi - n^2}}{n^2 \cos\varphi}$$ Equation (1)

$$\tan\frac{\theta_s}{2} = -\frac{\sqrt{\sin^2\varphi - n^2}}{\cos\varphi}$$

where n is the ratio of the refractive index $n_1$ of the 45° right angle prism medium to the refractive index $n_2$ of the surrounding medium described by $n = n_2/n_1$. Then, $\varphi$ is an incident angle of the light to be measured with respect to the first reflective surface 13a. As described above, the incident angle $\varphi$ is 45°. The relative phase difference $\theta = \theta_p - \theta_s$ of the P polarization component and the S polarization component of the light to be measured at this time has the following relationship, based on the above equation.

$$\tan\frac{\theta}{2} = \frac{\cos\varphi\sqrt{\sin^2\varphi - n^2}}{\sin^2\varphi}$$ Equation (2)

Based on such a relational expression regarding the relative phase difference $\theta$, glass material with a refractive index $n_1$ that has a relative phase difference $\theta$ of 45°, or $\pi/4 = \lambda/8$, is selected as the glass material of the 45° right-angle prism. For example, as described above, glass material with a refractive index $n_1$ of 1.5538 is selected as medium for a 45° right-angle prism.

The light to be measured reflected on the first reflective surface 13a of the 45° right-angle prism is incident on the second reflective surface 13b. At this time, the P polarization component and the S polarization component of the light to be measured is given a phase difference according to the above equation based on the same principle as the first reflecting surface 13a. As a result, the total phase difference between the P polarization component and the S polarization component of the light to be measured, which has been returned by the 45° right-angle prism, is 90°, i.e. n/2=λ/4. Therefore, the light to be measured, which is incident on the 45° right-angle prism in a linearly polarized state, exits from the 45° right-angle prism in a circularly polarized state.

The light to be measured, which has transmitted the first non-polarizing beam splitter 12a and traveled straight through the second optical path R2, is a linearly polarized light wave with its axis tilted at 45°. The light to be measured, which has been reflected by the first non-polarizing beam splitter 12a and turned back with a phase difference of 90° between the P polarization component and the S polarization component given by the 45° right angle prism, is a circularly polarized light wave. These two light waves are combined by the second non-polarizing beam splitter 12b.

The light to be measured that is combined by the second non-polarized beam splitter 12b is incident, as a polarizing beam splitter, on the third optical component 14, and is split into P polarization component and S polarization component by the polarizing beam splitter. The P polarization component split by the polarizing beam splitter is detected by the P polarization detector 11a. The S polarization component split by the polarizing beam splitter is detected by the S polarization detector 11b.

When the light wave resulting from traveling of the P polarization component and the S polarization component of the light to be measured straight through the second optical path R2, with the same phase, and the light wave resulting from propagating through the first optical path R1, with a phase difference of 90° in P polarization component and S polarization component, are mixed by the second non-polarizing beam splitter 12b, the interference signals based on the split P polarization component and S polarization component have phases difference from each other by 90°. For example, the relative signal intensities $I_p$ and $I_s$ of the interference signals output from the P polarization detector 11a and the S polarization detector 11b, respectively, are expressed by the following equation, where the incident power of the light to be measured when it enters the interferometer 10 is defined as 1 and the loss on the optical path is neglected.

$I_p = \frac{1}{4}\{1-\cos(2kd+2\theta p)\}$ $I_s = \frac{1}{4}\{1-\cos(2kd+2\theta_s)\}$  Equation (3)

These equations can be rewritten as follows, based on $\theta p - \theta s = \pi/4$.

$I_p = \frac{1}{4}\{\cos(2kd+2\theta_p)\}$ $I_s = \frac{1}{4}\{1-\sin(2kd+2\theta_p)\}$  Equation (4)

where k is a wave number and is represented by $k = 2\pi n_1/\lambda$. λ is a wavelength of the light to be measured, and d is a distance along the y direction from the reflection point of the light to be measured in the first non-polarizing beam splitter 12a to the reflection point of the light to be measured in the 45° right-angle prism. Since half of the power of the light to be measured is lost by the second non-polarizing beam splitter 12b, with respect to each of the relative signal intensities $I_p$ and $I_s$, the incident power 1 of the light to be measured when it enters the interferometer 10 is multiplied by a factor of ¼.

An optical path difference 2d of the light to be measured is caused by the distance d between the first optical path R1, which is a reflection optical path, and the second optical path R2, which is a straight traveling optical path. As a result, a phase difference δ based on the optical path difference 2d is caused between the light to be measured propagating in the first optical path R1 and the light to be measured propagating in the second optical path R2. The detector 11 outputs interference signals based on the phase difference S. The phase difference δ is expressed by the following equation.

$$\delta = \frac{4\pi n_1 d}{\lambda} = 2kd$$  Equation (5)

where configurations and mediums of the first non-polarizing beam splitter 12a and the second non-polarizing beam splitter 12b are assumed to be the same.

Figure 4:
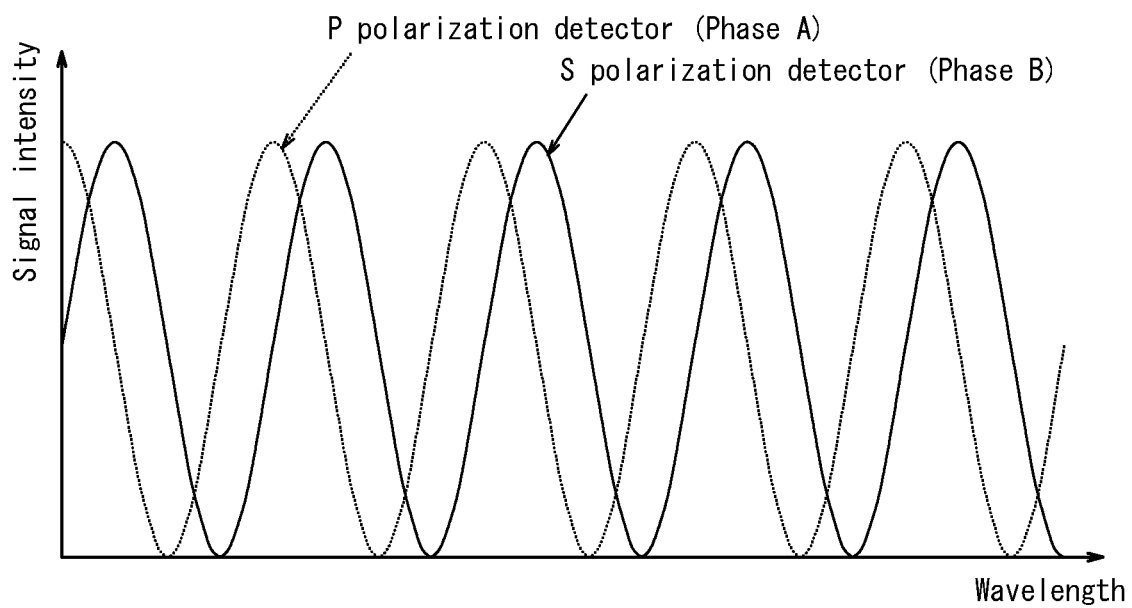
FIG. 4 is a graph illustrating an example of interference signals output by a detector in FIG. 2.
Figure 5:
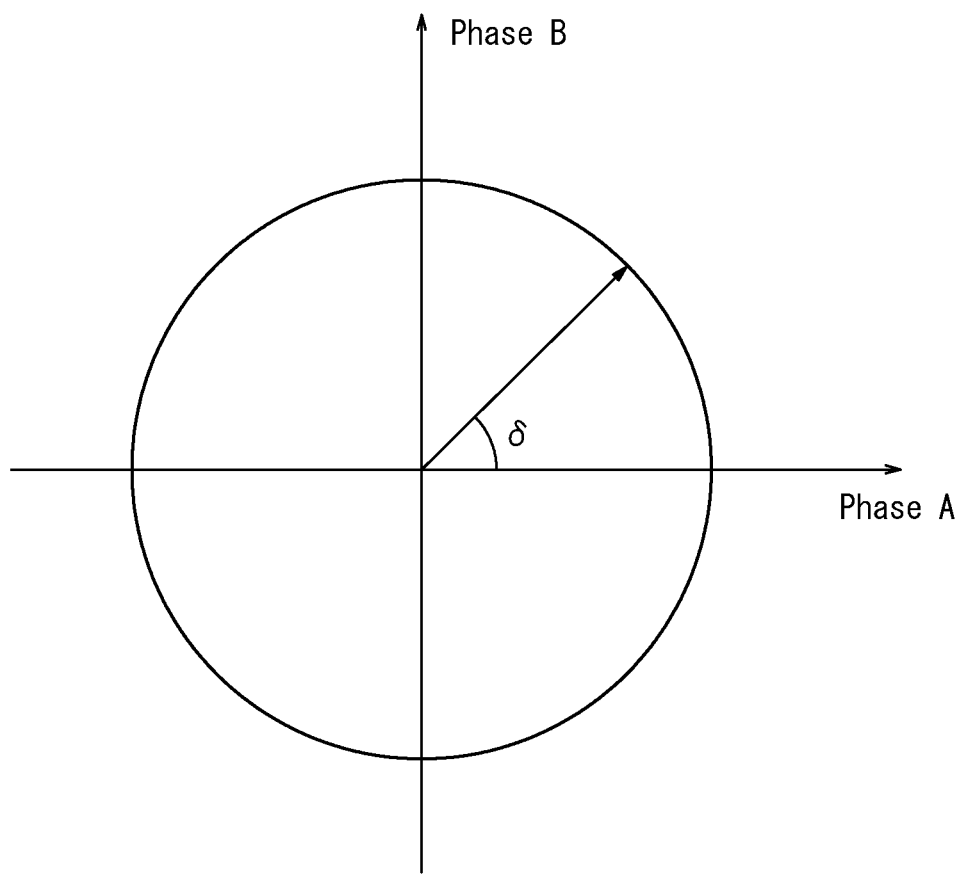
FIG. 5 is a Lissajous figure obtained based on the two interference signals in FIG. 4.

FIG. 4 is a graph illustrating an example of the interference signals output by the detector 11 in FIG. 2. FIG. 5 is a Lissajous figure obtained based on the two interference signals in FIG. 4.

If the wavelength λ of the light to be measured changes while the distance d remains constant, the phase difference δ also changes. Therefore, the intensity of the interference signal output from each of the P polarization detector 11a and the S polarization detector 11b sinusoidally changes. Then, the interference signal from the P polarization detector 11a and the interference signal from the S polarization detector 11b have a phase difference of 90°. In contrast, these interference signals have the same frequency and amplitude. Therefore, the Lissajous figure based on the two interference signals is a perfect circle.

The wavelength of the light to be measured can be calculated by associating the angle δ of the circle of the Lissajous figure illustrated in FIG. 5 with the wavelength of the light to be measured. For example, the controller 70 of the optical instrument 1 can calculate a relative change of the wavelength of the output light from the light source 20. The controller 70 can calculate the current wavelength of the output light by calculating the change in the wavelength relative to the initial wavelength of the output light. For example, the controller 70 obtains the interference signal from the P polarization detector 11a as phase A and the interference signal from the S polarization detector 11b as phase B, thus obtains two interference signals from the detector 11. As a result, the controller 70 can calculate the wavelength of the light to be measured from the phase difference δ using the same principle as the rotary encoder to detect the rotation angle position of the motor. At this time, the interferometer 10 is realized as a so-called light wavelength encoder.

According to the interferometer 10 and the optical instrument 1 of the first embodiment described above, configuration of the optical system can be simplified. The effects of the interferometer 10 is mainly explained below, but the same explanation is also applied to the effect of the optical instrument 1 having the interferometer 10.

For example, the optical surface of the second optical component 13 gives a phase difference between the P polarization component and the S polarization component of the light to be measured while changing the propagation direction of the light to be measured. As a result, configuration of the optical system in the interferometer 10 is simplified compared with the conventional Michelson interferometer or Mach-Zehnder interferometer which is incorporated the wavelength plate made by such as birefringent crystals. In this case, the function of changing the polarization state of the light to be measured and the function of changing the propagation direction of the light to be measured are realized by different optical elements. In other words, the number of components of the optical system in the interferometer 10 is reduced. Therefore, the optical system of the interferometer 10 can be configured at a low cost. In addition, in the interferometer 10, the workload for assembling the optical system and difficulty of alignment for obtaining the interference of the light to be measured is reduced.

In addition, since the optical surface of the second optical component 13 gives a phase difference between the P polarization component and the S polarization component, instead of using a waveplate made of birefringent crystals such as quarts as in the conventional interferometers, the interferometer 10 can apply in a wide wavelength range. Thus, the interferometer 10 can realize stable operation in a wide wavelength range. For example, the interferometer 10 can be easily used in a wide wavelength range exceeding 100 nm. This reduces the need to compensate wavelength characteristics in the retardation. As a result, wavelength retardation errors of the interferometer 10 are reduced, and load of arithmetic processing to the interference signals from the interferometer 10 is also reduced.

Since the first optical component 12, the second optical component 13 and the third optical component 14 are all integrated, configuration of the optical system of the interferometer 10 is further simplified compared with the conventional Michelson interferometer or the Mach-Zehnder interferometer. Because each optical element is placed apart from each other in them. In addition, excluding the incident surface of the first optical component 12, where the light to be measured enters, and two exit surfaces of the third optical component 14, where the light to be measured exits, there are no boundary with the surrounding atmosphere at the optical path. Thus, all jointed surface between adjacent optical components, which made of glass, bound each other. This improves the refractive index matching at the joint surfaces and reduces the reflection loss of the light to be measured and the influence of stray light due to reflection. For example, the problem such as generation of stray light due to multiple reflection, which adds noise to the interference signals, can be prevented. As a result, there is no need to form a non-reflective coating and a low-reflective coating at all joint surfaces. Thus, the optical system in the interferometer 10 can be configured at a low cost.

Since the first optical component 12, the second optical component 13 and the third optical component 14 are integrated by optical contact, it is not necessary to apply an adhesive as a refractive index matching agent to all joints, and thus the configuration of the optical system of the interferometer 10 is further simplified. In addition, cost relating to such adhesive can be saved, and thus the optical system of the interferometer 10 can be configured at a low cost.

In the interferometer 10, the optical surface of the second optical component 13 includes a reflective surface. Thus, the interferometer 10 can give a phase difference between the P polarization component and the S polarization component of the light to be measured while changing the propagation direction of the light to be measured by reflection of the light to be measured on the reflective surface.

The reflective surface includes a first reflective surface 13a on which the light to be measured split by the first optical component 12 is reflected by total reflection, and a second reflective surface 13b on which the light to be measured reflected by the first reflective surface 13a is further reflected by total reflection toward the first optical component 12. As a result, in the interferometer 10, the transmission loss of the light to be measured, which is split into the first optical path R1, on the first reflective surface 13a and the second reflective surface 13b is reduced to substantially zero. In other words, in the interferometer 10, the first optical path R1 can be realized with extremely low transmission loss.

The phase difference given between the P polarization component and the S polarization component of the light to be measured at each of the first and second reflective surfaces 13a and 13b is 45°, which results in a total phase difference of 90° between the P polarization component and the S polarization component of the light to be measured at the second optical component 13. As a result, two interference signals of phase A and phase B in sinusoidal waveforms, whose phase difference is 90°, are obtained from the detector 11 with response to a change of the wavelength of the output light of the light source 20. Therefore, a signal, which is similar to a signal of the rotary encoder for detecting the rotation angle of the motor, can be obtained. Thus, the wavelength control of the light source 20 based on the feedback control to the drive mechanism of the light source 20 can be easily executed. For example, the encoder signal processing circuit of the motor constituting the drive mechanism of the light source 20 can be used as it is, and the motor can b e directly controlled by using the interference signal from the interferometer 10.

Since the incidence angle and the reflection angle of the light to be measured at each of the first reflective surface 13a and the second reflective surface 13b is 45°, the first optical path R1 is formed return path in 180° in the interferometer 10.

Since the second optical component 13 include a prism made of glass material, the optical component is less expensive compared with a waveplate made of birefringent crystals such as quartz, which may use in conventional interferometers as an optical element that changes the polarization state of the light to be measured. This allows the optical system of the interferometer 10 to be configured at a low cost.

Figure 6:
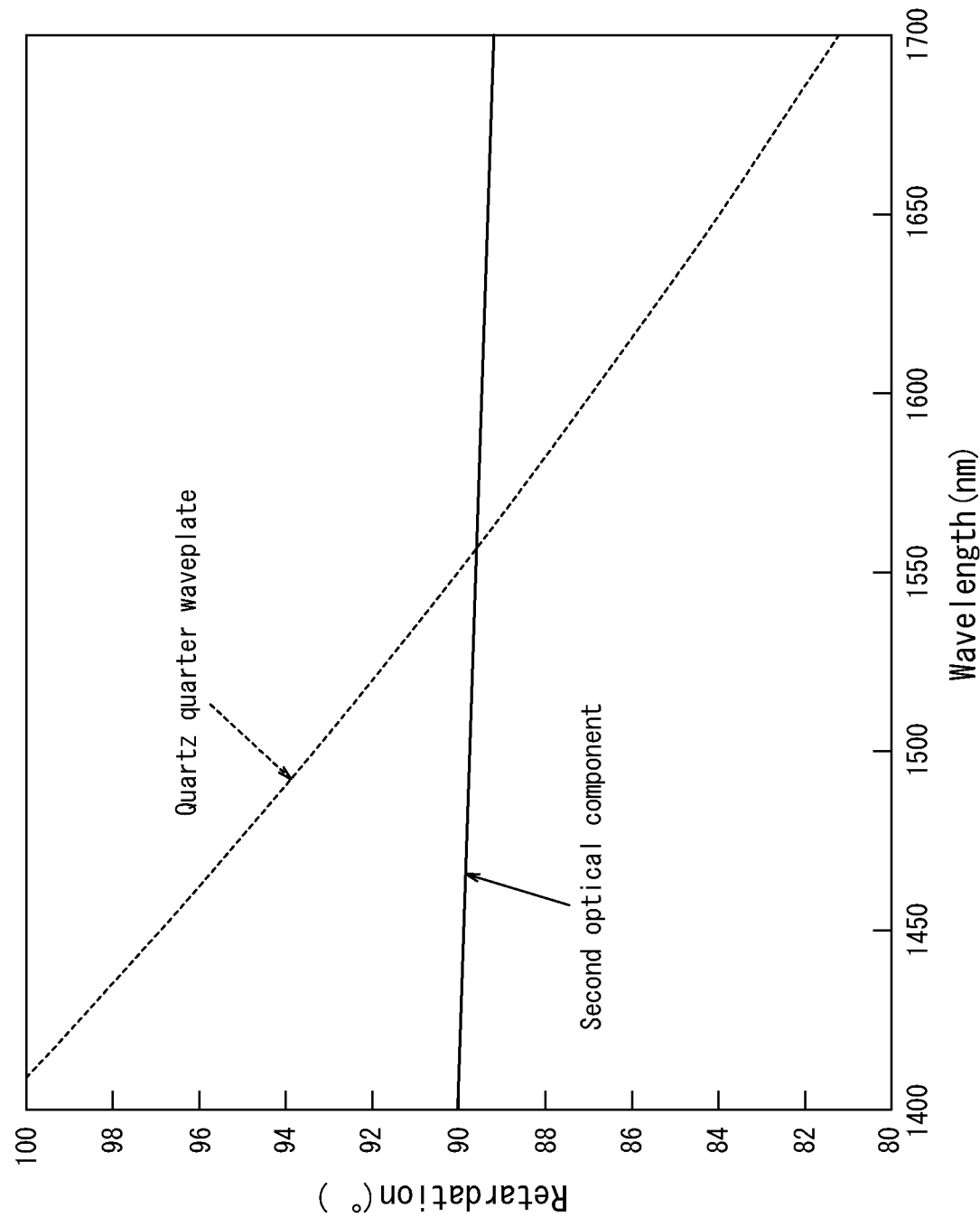
FIG. 6 is a graph for explaining the effect of the interferometer in FIG. 3.

FIG. 6 is a graph that explains the effect of the interferometer 10 in FIG. 3. FIG. 6 is a graph comparing the usable wavelength range without correction between a quarter waveplate composed of birefringent crystal s such as quartz and designed by a wavelength of 1550 nm and a second optical component 13 including a prism made of glass material. In FIG. 6, the dashed line shows the retardation of a quarter waveplate composed of birefringent crystals such as quartz. The solid line shows the retardation of the second optical component 13 including a prism made of glass material.

In the wavelength characteristics of the quarter waveplate made of quartz, the phase difference changes significantly from 90° when the wavelength of the light to be measured changes. In contrast, when the second optical component 13 is used, the wavelength characteristics is substantially constant with respect to the change in the wavelength of the light to be measured. For example, in the wavelength characteristics of the second optical component 13, the phase difference is maintained at about 90° even if the wavelength of the light to be measured changes. As described above, in the interferometer 10, the second optical component 13 for turning back using the total reflection has an extremely small wavelength dependence of retardation, as compared with the quarter waveplate made of crystal. Therefore, the interferometer 10 can realize stable operation in a wide wavelength range. For example, the interferometer 10 can be easily used even in a wide wavelength range exceeding 100 nm.

Because the first optical component 12 includes the first non-polarizing beam splitter 12a and the second non-polarizing beam splitter 12b, the light to be measured, which is incident on the interferometer 10, can be equally split, for example, at a ratio of 50:50 and combined again.

As described above, the phase difference δ depends on the distance d. This allows for easy design of a wavelength bandwidth that corresponds to one cycle of Lissajous, i.e., one cycle of sinusoidally changing interference signal, by appropriately designing the size of the first optical component 12 and the second optical component 13.

Second Embodiment of the Interferometer 10

Figure 7:
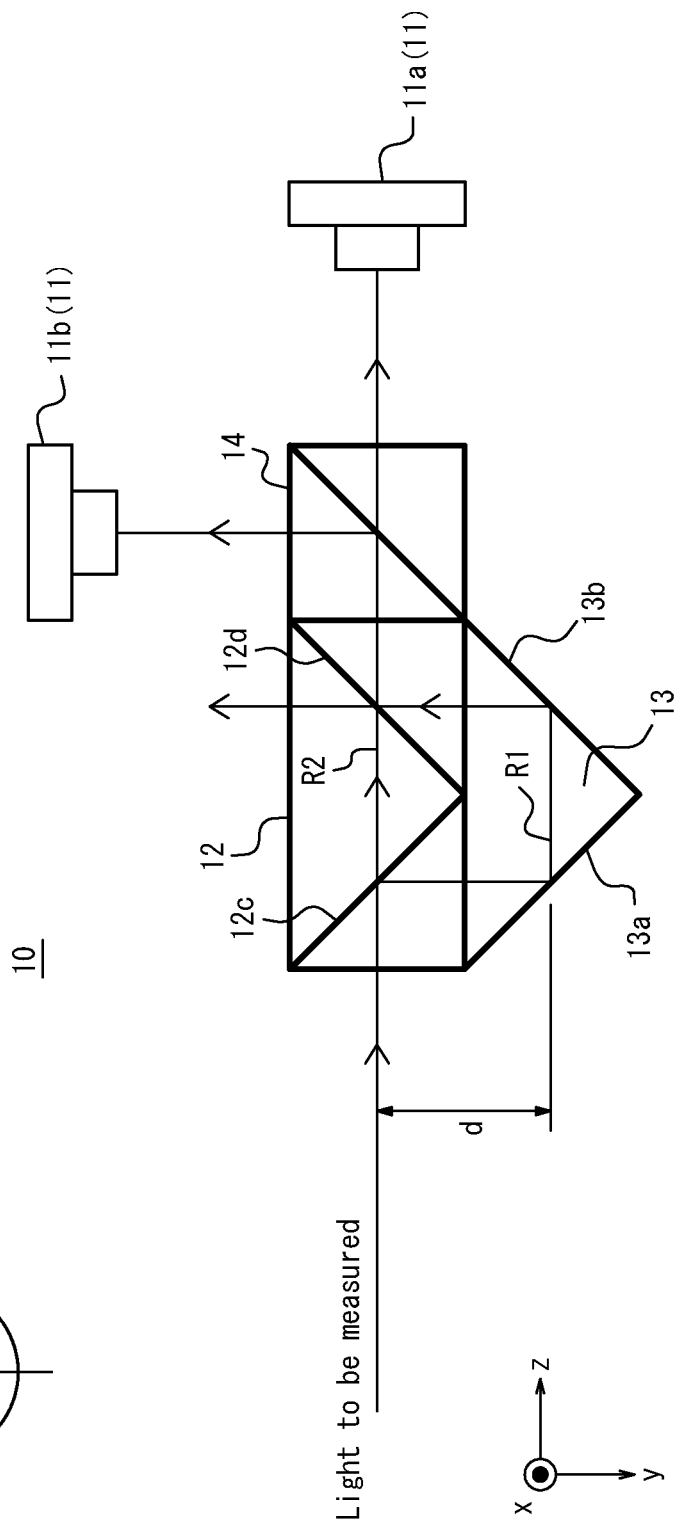
FIG. 7 is a schematic diagram illustrating a second embodiment of the interferometer in FIG. 1.

FIG. 7 is a schematic diagram illustrating a second embodiment of the interferometer 10 in FIG. 1. The configuration and the function of the interferometer 10 according to the second embodiment will be mainly described with reference to FIG. 7.

The interferometer 10 according to the second embodiment differs from the first embodiment in that the first optical component 12 does not include the first non-polarizing beam splitter 12a and the second non-polarizing beam splitter 12b and is configured as a single optical component. Other configurations, functions, effects, variations, and the like are the same as those of the first embodiment, and the corresponding explanation is applied also to the interferometer 10 according to the second embodiment. In the following, configurations, that are the same as those in the first embodiment, are designated by the same reference signs, and their explanation will be omitted. The points differ from the first embodiment will be mainly explained.

In the second embodiment, the first optical component 12 is configured as a single optical component having a first optical surface 12c and a second optical surface 12d. For example, the first optical component 12 does not include two non-polarizing beam splitters, but is configured as a single assembly of prisms.

A 50:50 reflective coating is formed on the first optical surface 12c and the second optical surface 12d. The reflective coating is a dielectric multilayer coating or a metal coating, or a hybrid coating formed by a combination thereof. The first optical surface 12c of the first optical component 12 splits each of the P polarization component and the S polarization component of the light to be measured, which is incident on the interferometer 10 into the first optical path R1 and the second optical path R2. The second optical surface 12d of the first optical component 12 combines the light to be measured split into the first optical path R1 and the second optical path R2.

In the interferometer 10 according to the second embodiment, the first optical component 12 is configured as a single optical component. Thus, the number of components can be reduced compared with the first embodiment. Therefore, compared with the first embodiment, the configuration of the optical system in the interferometer 10 can be further simplified.

Third Embodiment of the Interferometer 10

Figure 8:
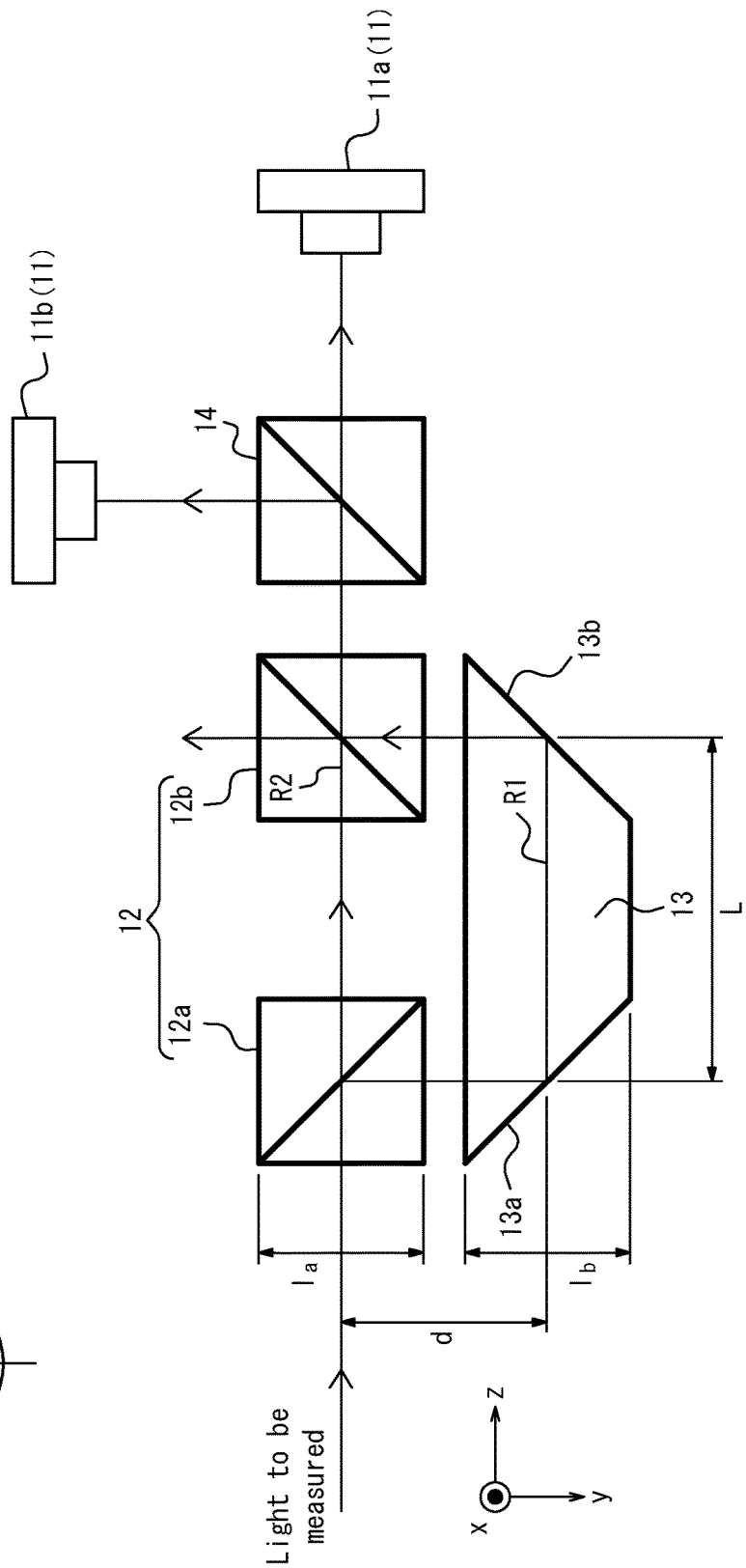
FIG. 8 is a schematic diagram illustrating a third embodiment of the interferometer in FIG. 1.

FIG. 8 is a schematic diagram illustrating a third embodiment of the interferometer 10 in FIG. 1. The configuration and the function of the interferometer 10 according to the third embodiment will be mainly described with reference to FIG. 8.

The interferometer 10 according to the third embodiment differs from the first embodiment in that the first optical component 12, the second optical component 13 and the third optical component 14 are placed apart from each other along the optical path. The other configurations, functions, effects and variations are the same as those of the first embodiment, and the corresponding explanations are applied to the interferometer 10 according to the third embodiment. In the following, configurations that are the same as those in the first embodiment are designated by the same reference signs and explanation thereof will be omitted. The points differ from the first embodiment will be mainly explained.

In the interferometer 10 according to the third embodiment, the first optical component 12, the second optical component 13 and the third optical component 14 are configured as an individual independent optical component. The first optical component 12, the second optical component 13 and the third optical component 14 are placed apart from each other along the optical path, and thus the above-described phase difference δ is expressed by the following equation:

$$\delta = \frac{2\pi\{2d + (L + l_b)(n_b - 1)\}}{\lambda} \qquad \text{Equation (6)}$$

where, when the medium is different between the first optical component 12 and the second optical component 13, the refractive index of the medium of the first optical component 12 is $n_a$, and the refractive index of the medium of the second optical component 13 is $n_b$. $l_a$ is the thickness of the first optical component 12 in the y direction. L is the center distance between the first non-polarizing beam splitter 12a and the second non-polarizing beam splitter 12b. $l_b$ is the thickness of the second optical component 13 in the y direction.

In the third embodiment according to the interferometer 10, a non-reflective or low-reflective coating is formed as needed on the boundary surface between each optical component and the ambient atmosphere including the air, vacuum, and purged nitrogen.

In the interferometer 10 according to the third embodiment, as in the first embodiment, the second optical component 13 includes a prism made of glass material, which makes the optical component less expensive than the conventional waveplate made of quartz or other material. Therefore, the optical system in the interferometer 10 can be configured at a low cost. In addition, as in the first embodiment, the interferometer 10 can realize stable operation in a wide wavelength range. For example, the interferometer 10 can be used easily in a wide wavelength range exceeding 100 nm.

As described above, the phase difference δ depends on the distance d, the central distance L and the thickness $l_b$ in the y direction. This allows the wavelength width corresponding to one cycle of Lissajous, thus, one cycle of sinusoidally changing interference signal, to be easily designed by appropriately designing the component distance between the first optical component 12 and the second optical component 13 and the size thereof.

Fourth Embodiment of the Interferometer 10

Figure 9:
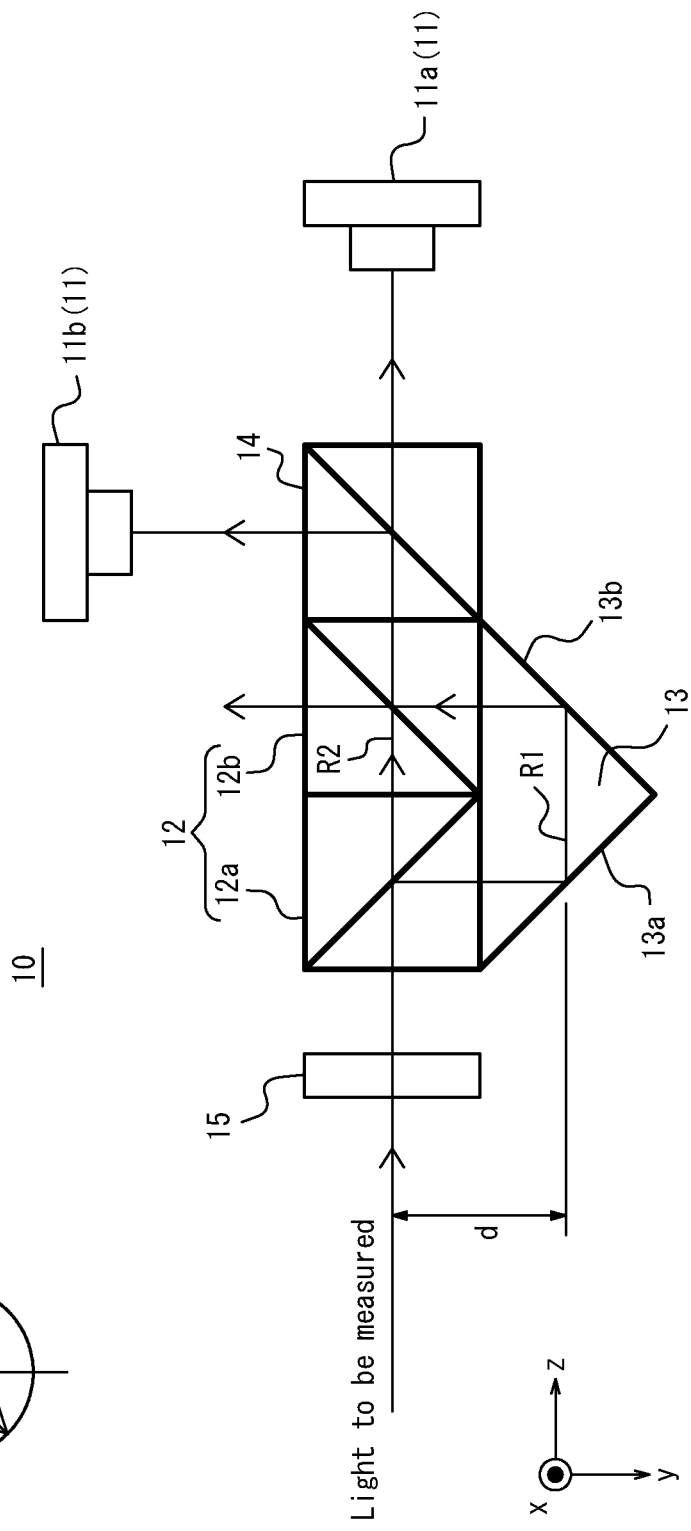
FIG. 9 is a schematic diagram illustrating a fourth embodiment of the interferometer in FIG. 1.

FIG. 9 is a schematic diagram illustrating a fourth embodiment of the interferometer 10 in FIG. 1. The configuration and the function of the interferometer 10 according to the fourth embodiment will be mainly described with reference to FIG. 9.

The interferometer 10 according to the fourth embodiment differs from the first embodiment in that the fourth optical component 15 is further placed in the front stage of the integrated first optical component 12, the second optical component 13 and the third optical component 14. The other configurations, functions, effects and variations are the same as those of the first embodiment, and the corresponding explanations are applied to the interferometer 10 according to the fourth embodiment. In the following, configurations that are the same as those in the first embodiment are designated by the same reference signs and explanation thereof will be omitted. The points differ from the first embodiment will be mainly explained.

The fourth optical component 15 is placed on the input side of the interferometer 10. The fourth optical component 15 includes a polarization controller such as a polarized wave controller, for example. The polarization controller may be composed of a half waveplate and a quarter waveplate, or may be composed of a polarizer placed in the 45° direction.

The interferometer 10 according to the fourth embodiment has further the fourth optical component 15. Thus, even when the light to be measured is emitted from an optical fiber, for example, and the polarization state of the light to be measured is unstable, it is possible to adjust the polarization state of the light to be measured to a linear polarization state tilted by 45° before it enters each of the integrated optical components.

Fifth Embodiment of the Interferometer 10

Figure 10:
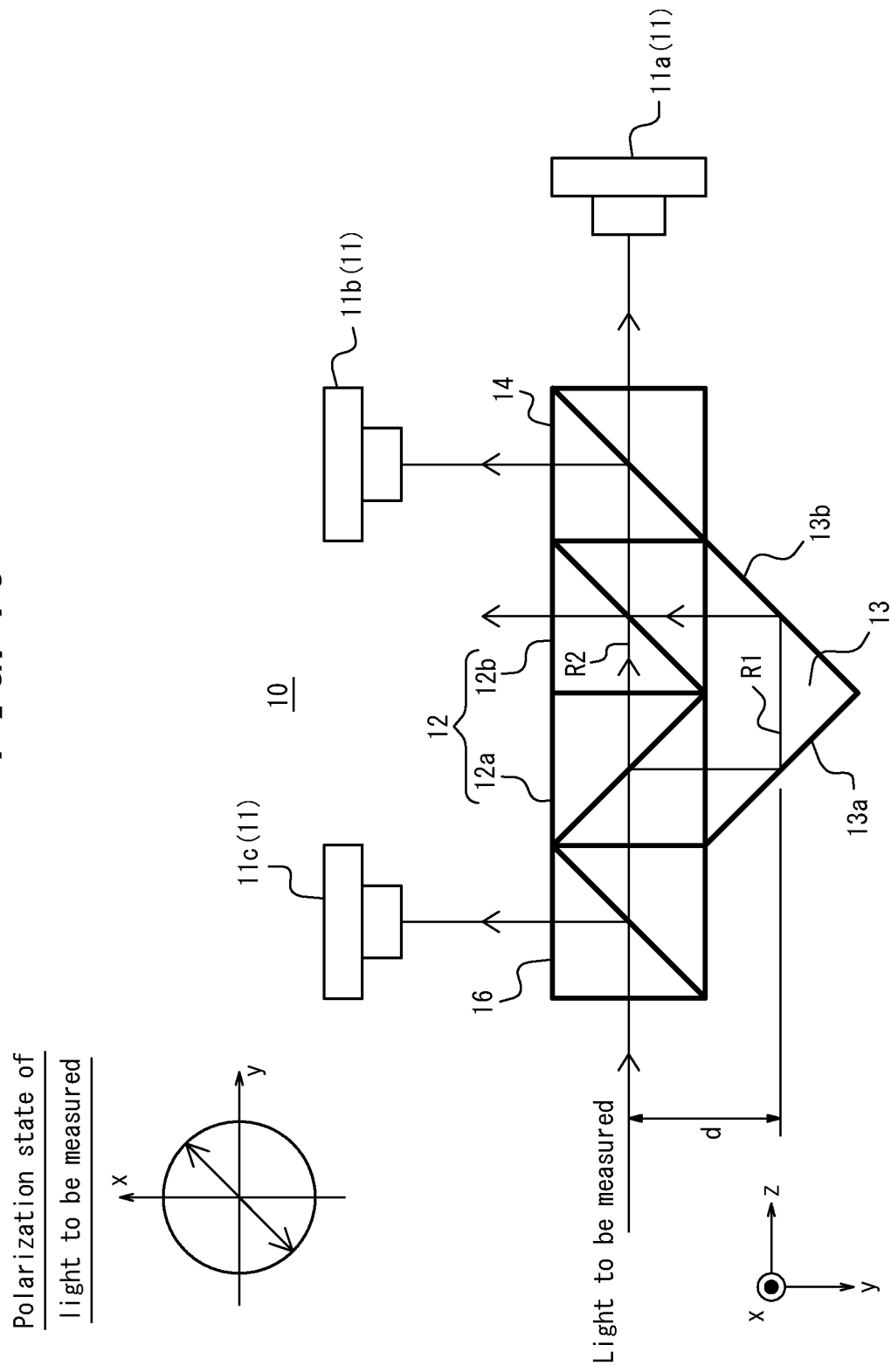
FIG. 10 is a schematic diagram illustrating a fifth embodiment of the interferometer in FIG. 1.
Figure 11:
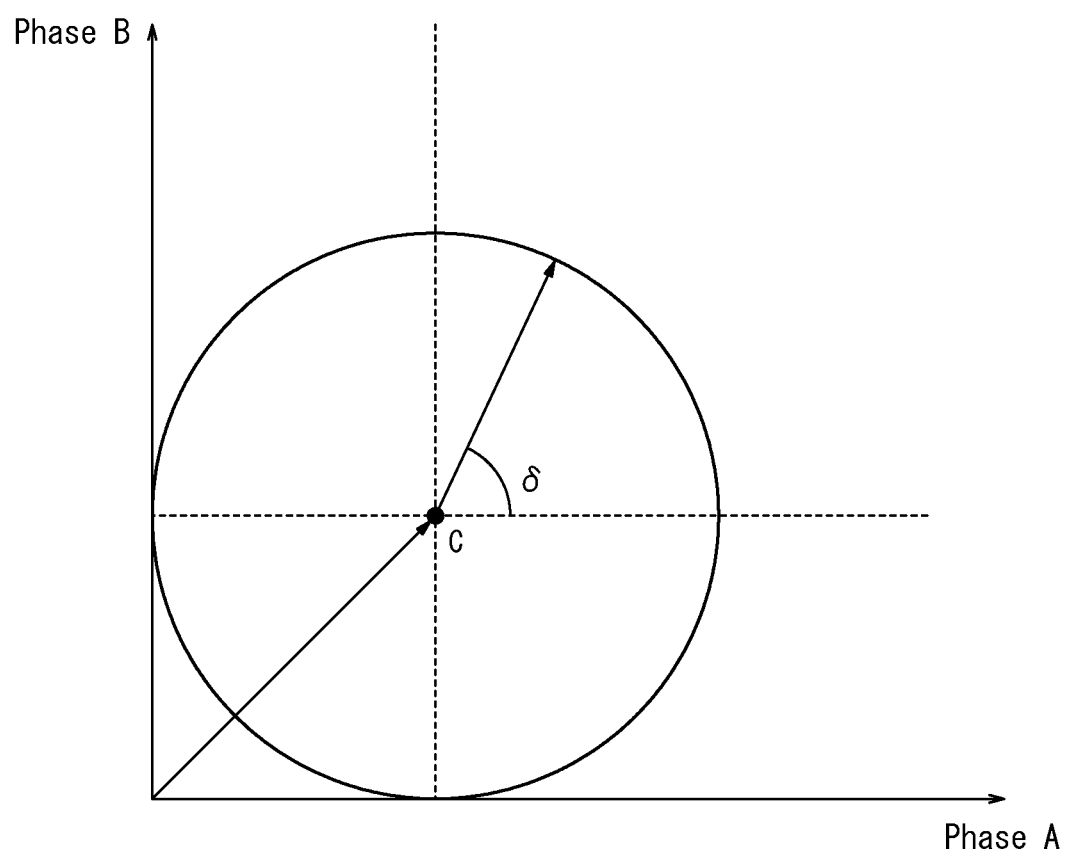
FIG. 11 is a Lissajous figure corresponding to FIG. 5, obtained based on the interferometer in FIG. 10.

FIG. 10 is a schematic diagram illustrating a fifth embodiment of the interferometer 10 in FIG. 1. FIG. 11 is a Lissajous figure corresponding to FIG. 5, obtained based on the interferometer in FIG. 10. The configuration and the function of the interferometer 10 according to the fifth embodiment will be mainly described with reference to FIGS. 10 and 11.

The interferometer 10 according to the fifth embodiment differs from the first embodiment in that a fifth optical component 16 is further integrally placed in the front stage of the first optical component 12, the second optical component 13 and the third optical component 14, and the detector 11 further includes an incident light detector 11c. The other configurations, functions, effects and variations are the same as those of the first embodiment, and the corresponding explanations are applied also to the interferometer 10 according to the fifth embodiment. In the following, configurations that are the same as those in the first embodiment are designated by the same reference signs and explanation thereof will be omitted. The points differ from the first embodiment will be mainly explained.

The fifth optical component 16 is placed on the input side of the interferometer 10. The fifth optical component 16 includes a non-polarizing beam splitter, for example. The fifth optical component 16 splits the light to be measured, which is incident on the interferometer 10, toward the first optical component 12 and the incident light detector 11c. For example, the fifth optical component 16 splits the light to be measured at a ratio of 50:50.

In the interferometer 10 according to the fifth embodiment, the fifth optical component 16 is placed on the incident side and the incident power of the light to be measured is monitored by the incident light detector 11c. In this manner, the center C of the Lissajous illustrated in FIG. 11 can be calculated.

For example, when all of three non-polarizing beam splitters have a wave splitting ratio of 50:50, the signal intensity of the received light signal output from the incident light detector 11c will be four times the center C of the Lissajous. Therefore, the center C of the Lissajous can be calculated with the correction factor R=¼.

With the interferometer 10 according to the fifth embodiment, the controller 70 of the optical instrument 1 can accurately perform normalization processing to the sinusoidal interference signals in response to a change in the incident power of the light to be measured. In this manner, the interferometer 10 can be used to correct the interference signal in response to a change in the incident power of the light to be measured.

Sixth Embodiment of the Interferometer 10

Figure 12:
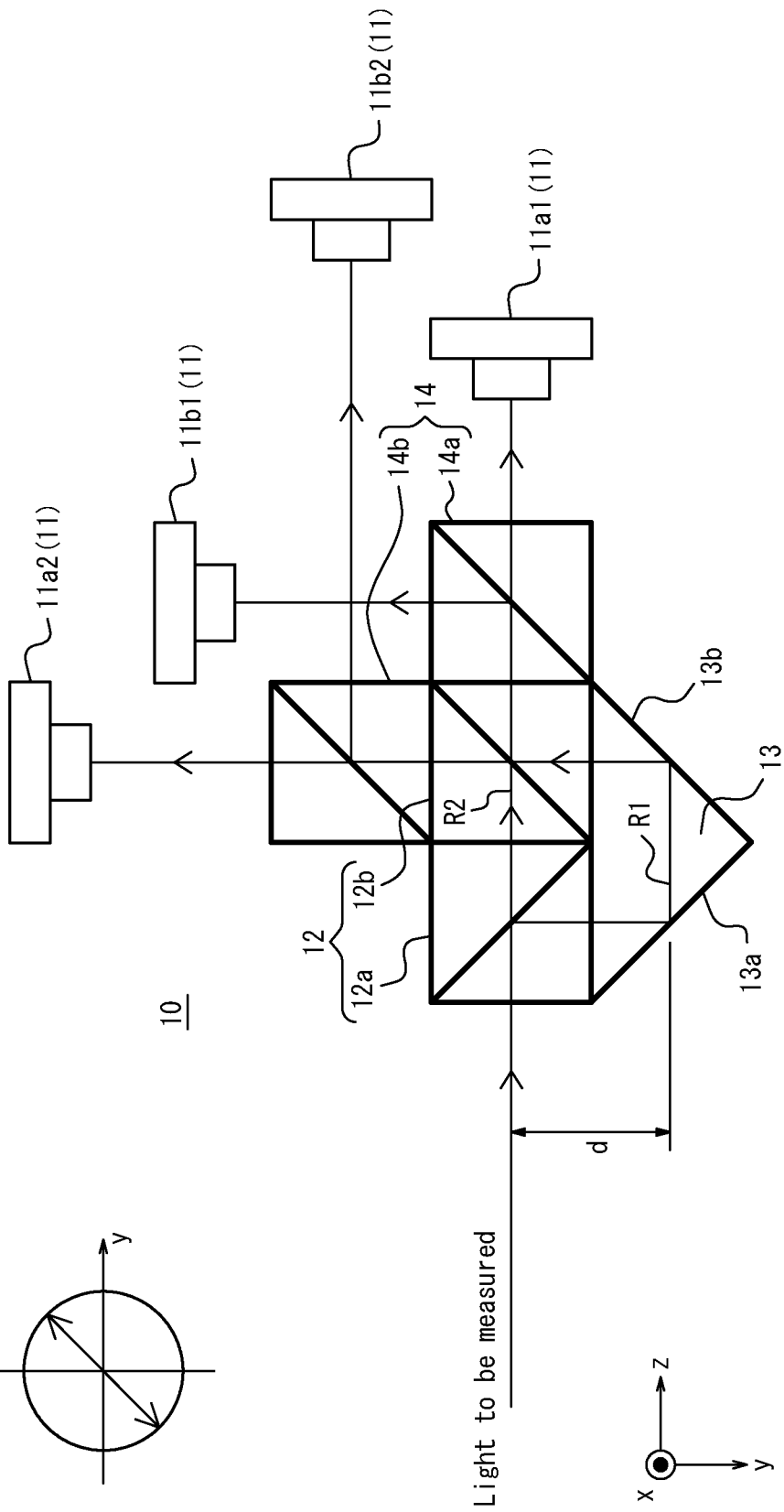
FIG. 12 is a schematic diagram illustrating a sixth embodiment of the interferometer in FIG. 1.
Figure 13:
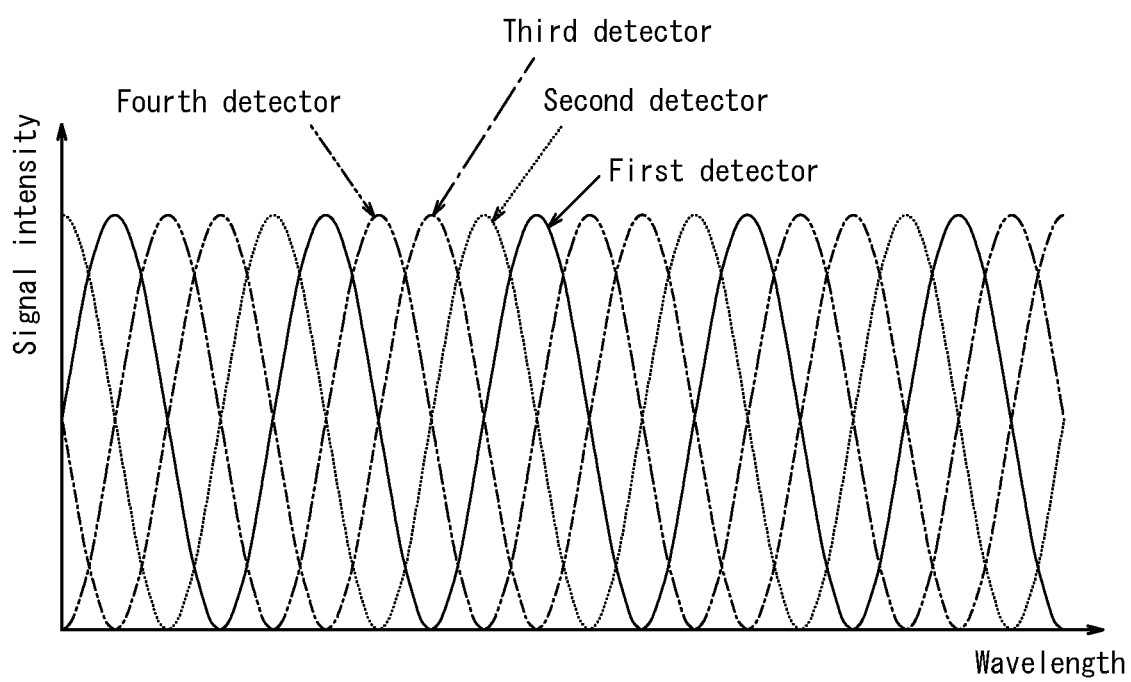
FIG. 13 is a graph illustrating an example of interference signals output by the detector in FIG. 12.

FIG. 12 is a schematic diagram illustrating a sixth embodiment of the interferometer 10 in FIG. 1, and FIG. 13 is a graph illustrating an example of interference signals output by the detector 11 in FIG. 12. The configuration and the function of the interferometer 10 according to the sixth embodiment will be mainly described with reference to FIGS. 12 and 13.

The interferometer 10 according to the sixth embodiment differs from the first embodiment in that the configurations of the third optical component 14 and the detector 11 are different. The other configurations, functions, effects and variations are the same as those of the first embodiment, and the corresponding explanations are applied also to the interferometer 10 according to the sixth embodiment. In the following, configurations that are the same as those in the first embodiment are designated by the same reference signs and explanation thereof will be omitted. The points differ from the first embodiment will be mainly explained.

The third optical component 14 includes a first polarizing beam splitter 14a and a second polarizing beam splitter 14b. In addition, the P polarization detector 11a includes a first detector 11a1 that detects the P polarization component split by the first polarizing beam splitter 14a and a third detector 11a2 that detects the P polarization component split by the second polarizing beam splitter 14b. The S polarization detector 11b includes a second detector 11b1 that detects the S polarization component split by the first polarizing beam splitter 14a and a fourth detector 11b2 that detects the S polarization component split by the second polarizing beam splitter 14b.

In the interferometer 10 according to the sixth embodiment, the other combined light of the second non-polarizing beam splitter 12b is split by the second polarizing beam splitter 14b, and thus another set of interference signals with phases different from each other by 90° can be output, in addition to a set of interference signals illustrated in FIG. 4. As illustrated in FIG. 13, the interferometer 10 is capable of outputting four interference signals with phases different from each other by 90°. For example, if the incident power of the light to be measured to the interferometer 10 is 1, the relative signal intensities $I_1$, $I_2$, $I_3$, and $I_4$ of the interference signals output from the first detector 11a1 through the fourth detector 11b2, respectively, have the following relationship.

$I_1+I_2+I_3+I_4=1$ $I_3=\bar{I}_1$ $$I_4 = \bar{I}_2 \quad \text{Equation (7)}$$

As described above, with the interferometer 10 according to the sixth embodiment, the controller 70 of the optical instrument 1 can easily calculate the incident power of the light to be measured by adding these four interference signals. The controller 70 of the optical instrument 1 can accurately perform normalization processing to the sinusoidal interference signals in response to a change in the incident power of the light to be measured. In this manner, the interferometer 10 can be used to correct the interference signal in response to a change in the incident power of the light to be measured.

It is obvious to those skilled in the art that this disclosure can be realized in the predetermined forms other than the embodiments described above, without departing from its spirit or its essential features. Therefore, the above descriptions are exemplary and are not limited thereto. The scope of the disclosure is defined by the appended claims, not by the description described above. Some of all modifications that are within the equal scope shall be encompassed within the claims.

For example, the shape, the arrangement, the orientation, and the number of each of the above-mentioned components are not limited to those illustrated in the above descriptions and drawings. The shape, the arrangement, the orientation, and the number of each component may be configured in any manner, as long as its function can be realized.

In each embodiment described above, it has been explained that the optical surface of the second optical component 13 includes a reflective surface, but this disclosure is not limited thereto. The optical surface may include any surface capable of changing the propagation direction of the light to be measured and giving a phase difference between the P polarization component and S polarization component of the light to be measured.

In each embodiment described above, it has been explained that the reflective surface includes the first reflective surface 13a and the second reflective surface 13b, but this disclosure is not limited thereto. The reflective surface may include only one surface or three or more surfaces, as long as it is capable of properly providing a phase difference that is required in the interferometer 10 between the P polarization component and S polarization component of the light to be measured and contributing to the output of interference signals.

In each embodiment described above, it has been described that the phase difference of each of the first reflective surface 13a and the second reflective surface 13b is 45°, but this disclosure is not limited thereto. The phase difference may be any value at each of the first reflective surface 13a and the second reflective surface 13b, as long as interference signals are obtained that enable the controller 70 to use the interferometer 10 to calculate the relative change in wavelength of the output light from the light source 20 and to perform wavelength control of the light source 20, etc. The second optical component 13 may give a phase difference of any value between the P polarization component and the S polarization component of the light to be measured in the first optical path R1, without being limited to the phase difference of 90° in total.

In each of the above-described embodiments, it has been described that the incident angle and the reflection angle of the light to be measured are 45° on each of the first reflective surface 13a and the second reflective surface 13b, but this disclosure is not limited thereto. Each of the incident angle and the reflection angle of the light to be measured does not have to be 45°.

In each of the above-described embodiments, it has been described that the refractive index $n_1$ is selected so that the relative phase difference θ will be 45°, but this disclosure is not limited thereto. The incident angle of the light to be measured with respect to each of the first reflective surface 13a and the second reflective surface 13b may be adjusted so that a desired relative phase difference θ can be obtained.

In each of the above-described embodiments, it has been described that the second optical component 13 includes a prism made of glass material, but this disclosure is not limited thereto. The second optical component 13 may include any optical element that is inexpensive as an optical component and usable in a wide wavelength range.

In each of the above-described embodiments, it has been described that the split ratio of the non-polarizing beam splitter is 50:50, but this disclosure is not limited thereto. The split ratio of the non-polarizing beam splitter does not have to be 50:50.

In each embodiment where the first optical component 12, the second optical component 13, and the third optical component 14 are all integrated, adhesives including UV-curable adhesive and thermosetting adhesive may be effective as refractive index matching agents to optically bound the optical components. This realizes low reflection of the light to be measured at the joints. In this case, the non-reflective coating and the low-reflective coating may not be formed at the joints.

In each of the above-described embodiments, it has been described that a non-reflective coating or a low-reflective coating is formed on an incident surface of the first optical component 12 where the light to be measured enters and two exit surfaces of the third optical component 14 where the light to be measured exits, but this disclosure is not limited thereto. For example, a non-reflective coating or a low-reflective coating may not be formed as long as an influence of reflection of the light to be measured can be reduced by tilting these surfaces relative to the optical axis of the light to be measured.

In each of the above-described embodiments, the optical instrument 1 may include any device capable of measuring the wavelength of the light to be measured using the interferometer 10, for example. For example, the optical instrument 1 may include a light wavelength meter. In addition, the interferometer 10 may be placed outside, instead of being built in the optical instrument 1.

The invention claimed is:

1. An interferometer, comprising:
   a first optical component that splits each of a P polarization component and an S polarization component of a light to be measured that is incident on the interferometer into a first optical path and a second optical path and combines the light to be measured that is split into the first optical path and the second optical path;
   a second optical component placed in the first optical path;
   a third optical component that splits the light to be measured, which is combined by the first optical component, into the P polarization component and the S polarization component; and
   a P polarization detector and an S polarization detector that detect respectively the P polarization component and the S polarization component that are split by the third optical component, wherein the second optical component includes a prism made of glass material which has an optical surface that changes a propagation direction of the light to be measured and gives a phase difference between the P polarization component and the S polarization component, the first optical component, the second optical component and the third optical component are all integrated, and the second optical path passes only inside the first optical component.

2. The interferometer according to claim 1, wherein the optical surface of the second optical component includes a reflective surface.

3. The interferometer according to claim 2, wherein the reflective surface includes: a first reflective surface that reflects the light to be measured split by the first optical component by total reflection; and a second reflective surface that further reflects the light to be measured reflected by the first reflective surface toward the first optical component by total reflection.

4. The interferometer according to claim 3, wherein the phase difference is 45° at each of the first reflective surface and the second reflective surface.

5. The interferometer according to claim 3, wherein each of an incidence angle and a reflection angle of the light to be measured at each of the first reflective surface and the second reflective surface is 45°.

6. The interferometer according to claim 1, wherein the first optical component includes a first non-polarizing beam splitter that splits each of the P polarization component and the S polarization component into the first optical path and the second optical path and a second non-polarizing beam splitter that combines the light to be measured split into the first optical path and the second optical path.

7. The interferometer according to claim 1, wherein:

the third optical component includes a first polarizing beam splitter and a second polarizing beam splitter;

the P polarization detector includes a first detector that detects the P polarization component split by the first polarizing beam splitter and a third detector that detects the P polarization component split by the second polarizing beam splitter; and the S polarization detector includes a second detector that detects the S polarization component split by the first polarizing beam splitter and a fourth detector that detects the S polarization component split by the second polarizing beam splitter.

8. An optical instrument comprising the interferometer according to claim 1.

9. The interferometer according to claim 1, wherein the second optical component is in direct contact with the first optical component and the third optical component.

10. The interferometer according to claim 1, wherein the first optical component is in direct contact with the second optical component and the third optical component.

11. The interferometer according to claim 1, wherein the first optical component is in direct contact with the second optical component and the third optical component; and the second optical component is in direct contact with the third optical component.

12. The interferometer according to claim 1, wherein the second optical path is linear inside the first optical component before being combined with the first optical path by the first optical component.

* * * * *